(12) United States Patent
Gurevich et al.

(10) Patent No.: US 7,149,678 B2
(45) Date of Patent: Dec. 12, 2006

(54) HIGH LEVEL EXECUTABLE NETWORK ABSTRACT MACHINE

(75) Inventors: Yuri Gurevich, Redmond, WA (US); Margus Veanes, Bellevue, WA (US); Uwe Glässer, Paderborn (DE)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 10/112,319

(22) Filed: Mar. 28, 2002

(65) Prior Publication Data

US 2003/0191797 A1 Oct. 9, 2003

(51) Int. Cl.
*G06F 9/455* (2006.01)
*G06F 15/16* (2006.01)

(52) U.S. Cl. ............... 703/22; 703/2; 709/202; 709/232; 709/239; 700/49; 700/97

(58) Field of Classification Search ............ 703/2, 703/22; 709/223, 201, 202, 232, 239; 700/49, 700/97
See application file for complete search history.

(56) References Cited

U.S. PATENT DOCUMENTS

| | | | | |
|---|---|---|---|---|
| 5,963,447 A | * | 10/1999 | Kohn et al. | 700/49 |
| 6,363,421 B1 | * | 3/2002 | Barker et al. | 709/223 |
| 2003/0033039 A1 | * | 2/2003 | Gutberlet et al. | 700/97 |
| 2003/0156549 A1 | * | 8/2003 | Binder et al. | 370/252 |
| 2003/0217096 A1 | * | 11/2003 | McKelvie et al. | 709/202 |

OTHER PUBLICATIONS

Martelli, M. et al., Applying Logic Programming to the Specification of Complex Applications, 1997.
Kleijn, J.J.T., et al., A Process Algebra Based Verification of a Production System, 1998.
Cardelli, L., Wide Area Computation, Microsoft Research, 1998.
G. Del Castillo, W. Hardt, Fast Dynamic Analysis of Complex HW/SW-Systems based on Abstract State Machine Models, in: Proceedings of the Sixth International Workshop on Hardware/Software Codesign (CODES/CASHE'98), Seattle, Washington, Mar. 15-18, 1998, pp. 77-81.
Rettberg, A., Compilation of Flow Diagrams into Target Code for Embedded Systems, 1999.
Kara, M., et al., Update Plans for Parallel Architectures, Proceedings of the 3rd Abstract Machines Workshop, Abstract Machine Models for Parallel and Distributed Computing, IOS Press, 1996.
Sasaki, H. et al., Semantic Validation of VHDL-AMS by an Abstract State Machine, 1997.
Gurevich, Y., Sequential Abstract State Machines Capture Sequential Algorithms, MSR-TR-99-65, Micrososft Research, revised Feb. 20, 2000.
Barnett et al., "The ABCs of Specification: AsmL, Behavior, and Components", Jun. 2001, 11 pages.
Barnett et al., "Conformance Checking of Components Against Their Non-deterministic Specifications", Technical Report MSR-TR-2001-56, Jun. 2001, 18 pages.

(Continued)

*Primary Examiner*—Thai Phan
(74) *Attorney, Agent, or Firm*—Klarquist Sparkman LLP

(57) ABSTRACT

A generic algorithm for simulating communications software in the network environment, based on the model of plural Abstract State Machines (ASMs) is discussed. Other properties and behaviors can supplement the generic case, for example, network topology, delaying behaviors, message transport reliability, and message priority. Plural executing agents, each a sequential abstract state machine, are combined to simulate the behavior of a dynamic network environment. Agent and message behavior is altered based on the proposed or selected network under simulation. The desired behaviors and constraints are coded, compiled, and executed using an executable abstract state machine language.

23 Claims, 7 Drawing Sheets

OTHER PUBLICATIONS

Barnett et al., "Specification, Simulation and Testing of COM Components Using Abstract State Machines", Technical report, Microsoft Research, undated, 5 pages.

Cardelli, "Wide Area Computation", Microsoft Research, 1998. 16 pages.

Comer, "Internetworking with TCP/IP, vol. 1: Principles, Protocols, and Architecture", Chapters 4, 5, and 7, Prentice Hall, © 2000, pp. 63-87 and 95-114.

Del Castillo et al., "Fast Dynamic Analysis of Complex HW/SW-Systems based on Abstract State Machine Models", *Proceedings of the Sixth International Workshop on Hardware/Software Codesign(CODE/CASHE'98)*, Seattle, Washington, Mar. 15-18, 1998, pp. 77-81.

Glässer et al., "An Abstract Communication Model", Technical Report MSR-TR-2002-55, May 2002, 34 pages.

Glässer et al., "High-Level Executable Specification of the Universal Plug and Play Architecture", *Proceedings of the 35th Annual Hawaii International Conference on System Sciences*, 2002, 10 pages.

Glässer et al., "Universal Plug and Play Machine Models", Technical Report MSR-TR-2001-59, Jun. 2001, 56 pages.

Grieskamp et al., "Conformance Testing with Abstract State Machines", Technical report msr-tr-2001-97, Microsoft Research, Oct. 2001, 16 pages.

Grieskamp et al., "Generating Finite State Machines from Abstract State Machines", Technical Report MSR-TR-2001-97, Oct. 2001, 19 pages.

Gurevich et al., "AsmL: The Abstract State Machine Language", White Paper, Nov. 2001, 86 pages.

Gurevich, "Evolving Algebras 1993: Lipari Guide", *Specification and Validation Methods*, Oxford University Press, © 1995, 26 pages.

Gurevich, "Sequential Abstract State Machines Capture Sequential Algorithms", MSR-TR-99-65, Microsoft Research, revised Feb. 20, 2000, pp. 1-32.

Kleijn et al., "A Process Algebra Based Verification of a Production System", 1998, 9 pages.

Martelli et al., "Applying Logic Programming to the Specification of Complex Applications", 1997, 9 pages.

Osborne, "Update Plans for Parallel Architectures", *Proceedings of the 3rd Abstract Machines Workshop*, Abstract Machine Models for Parallel and Distributed Computing, IOS Press, 1996, 12 pages.

Rettberg et al., "Compilation of Flow Diagrams into Target Code for Embedded Systems", 1999, 5 pages.

Sasaki et al., "Semantic Validation VHDL-AMS by an Abstract State Machine", 1997, 8 pages.

UPnP™ Forum, "UPnP™ Device Architecture", Version 1.0, Jun. 2000, 52 pages.

* cited by examiner

HIGH LEVEL EXECUTABLE NETWORK ABSTRACT MACHINE

TECHNICAL FIELD

This invention relates to modeling network designs, and more specifically, a generic algorithm for simulating communications software.

BACKGROUND AND SUMMARY

Abstract State Machines (ASMs) have been used to simulate computer programs. See Gurevich, Y., Sequential Abstract State Machines Capture Sequential Algorithms, Microsoft Research, MSR-TR-99-65, revised Feb. 20, 2000. Further, modeling a complex real-world problem using a multi-agent system with an executable specification has been proposed. See Martelli, M., et al., Applying Logic Programming to the Specification of Complex Applications, 1997. Additionally, a communication protocol language has been proposed for sending information between communicating agents. Id.

Although agents communicating through a communication channel has been proposed, there is no discussion of sending and receiving messages between a set of abstract state machines representing a distributed application, through a set of abstract state machines representing the complex topology of a network. None of the present systems propose for example, an abstract state machine network model that can be used to model lost messages or creation of hosts and subnets in a network topology. Nor for example, does any proposed system observe the effects of host and or subnet failures in a dynamic complex network environment, or how modifications in host or subnet behaviors effect a complex network environment.

Inefficiencies in a network design are often not discovered until testing an implementation of that design. Since implementing a network design is resource intensive, waiting until a design is implemented before discovering potential design flaws can be very expensive. Further, modifications made to an existing network implementation can create inefficiencies and other side effects that also remain latent until the modification is implemented. A model for observing how messages travel from plural hosts executing distributed applications through a proposed network topology, would be very valuable. Thus, it would be desirable to test a proposed network design or network modification before implementation.

The following embodiments explore algorithms for modeling aggregate network behaviors with plural interrelating abstract state machines representing the topology of a network. An executable specification for a network design in an abstract state machine language is created, thereby allowing an arbitrary design to be tested before implementation. In this regard, a generic algorithm, based on plural executing ASMs is discussed for simulating communications software in a network environment. The dynamic properties are determined through adjustable parameters of the generic algorithm such as network topology, delaying behaviors, and message transport protocol reliability. The discussion focuses first on a set of generalized agents including delivery agents and endpoint agents necessary for modeling a generic and dynamic network. To this minimum set, potential parameters necessary to model specific network behaviors are considered.

Such a network model can be used to model lost messages, creation and registration of hosts and subnets to the network topology, and consequences of host and or subnet failure. Further, the effects of changes in host behavior on the network can be modeled and observed.

In one aspect, plural agents, each a sequential abstract state machine, are combined to simulate the behavior of a network environment. The environment may be distributed. The agents send and receive messages on the model network. Message frequency, size, packet protocol, and other parameters are added and varied to test various behavioral aspects. Messages are broadcast, multi-cast, or point-to-point. Agent and message behavior is altered based on the proposed or selected network under simulation. The desired behaviors and constraints are coded, compiled, and executed using an executable abstract state machine language.

In another aspect, delivery agents are constrained to act as intermediaries to accept messages from and forward messages to other agents. Each of those other agents (or recipients) is again either a delivery agent or an endpoint agent.

In another aspect, endpoint agents and delivery agents are constrained to simulate network protocol specific behaviors, networks communicating with networks, or agents communicating with agents.

Thus, a generic adaptable algorithm as embodied in plural executing abstract state machine is now available to simulate network behavior. It can be used to simulate a combination of networks with dynamic and random behaviors. At the level of abstraction available with this generic algorithm as embodied in an abstract state machine, designers can alter the proposed design, play with varied scenarios, add and test proposed features, introduce random behavior, and generate test suites in order to determine how the proposed network responds.

Additional features and advantages will be made apparent from the following detailed description of the illustrated embodiment which proceeds with reference to the accompanying drawings.

DETAILED DESCRIPTION

In the following detailed description, an executable network abstract machine is embodied in a generic network simulation model. The generic network simulation model consists of plural agents that when combined simulate the abstracted behavior of the network. At a most generalized level of abstraction, the generic network simulation model includes endpoint agents and delivery agents.

Figure 1:
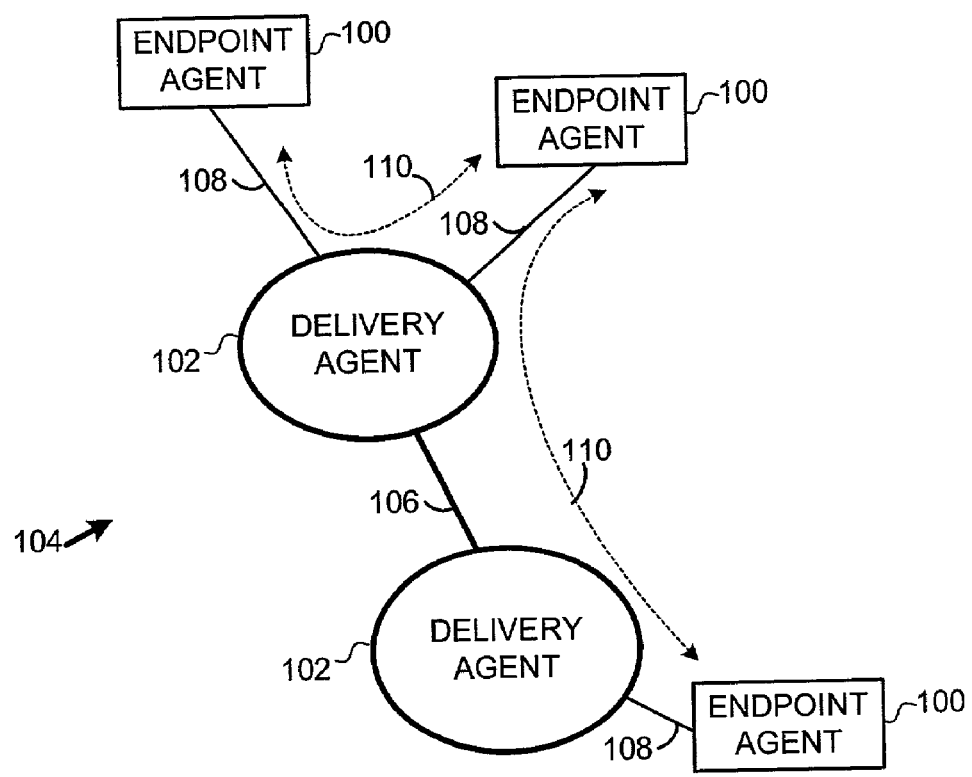
FIG. 1 is a network simulation system depicting endpoint agents and delivery agents.

With reference to FIG. 1, an embodiment of a network simulation model 104 is considered with endpoint agents 100 and delivery agents 102. The network simulation model, models concurrent behavior, meaning the agents 100, 102 are modeled as if they are running at the same time. In particular, the network behavior is simulated by the aggregate concurrent behavior of a group of such agents that communicate by message passing.

Endpoint agents 100 model computers or devices that utilize the network to pass messages 110 to facilitate communication, to obtain services, or to offer services to the network or other endpoint agents. Delivery agents 102 generally model two kinds of behavior—message delivery or message forward. A delivery agent can forward a received message to one or more other delivery agents 106, or a delivery agent can deliver a received message 108 to one or more endpoint agents 100. So at the highest level of abstraction, FIG. 1 illustrates the minimal things a network simulation must do.

To this highest level of abstraction, other behaviors are added or parameterized in order to simulate more specialized network behaviors or test proposed network behaviors. A few examples of behaviors that could be modeled and tested under varied and/or parameterized conditions are not limited to network loading, network access contention, aberrant subnets, router, host, or device behavior, network protocols, message sizes, time-to-live variations, bandwidth variations, feast or famine variations, mixing protocols, concurrent packet switching and circuit switching, server farm spawning variations, dynamic host or subnet registration, subnet host or failure recovery methodologies, and the like.

Of course, the delivery agents and endpoint agents are programmed to simulate the behaviors of the proposed network conditions under test. These behaviors are described in an executable specification, and then compiled and run. Thus, conditions are simulated before resources are expended to develop the actual implementation.

Further, the number of delivery agents and endpoint agents can change dynamically during execution of the model. And it is the aggregate behavior of the combined delivery agents and endpoint agents that simulate network behavior. This generalized methodology is used to describe network behavior. Every agent is individually sequential in nature, where a single step in this sequence is in itself a synchronous parallel transaction, an the network model includes a possibly expanding and contracting universe of agents, where agents are created and removed dynamically.

For each agent there exists itself and the rest of the world. Every agent can be a different sequential abstract state machine, and together they model a distributed abstract state machine. Agents can run asynchronously independent of each other, and they can send messages to each other by sending messages into each other's mail boxes. To send a message, an agent places the message in an out-box, and another agent checks the box for messages.

So, the network simulation is a universe of agents sending and receiving messages. Each agent runs an abstract state machine. Altogether, the network behavior is created. Proposed networks are modeled, and proposed changes to those behaviors are modeled in advance to determine how proposed changes effect aggregate network behavior.

A delivery agent is not necessarily a router; they are more general in nature than a router. For example, from FIG. 1, it is apparent that a delivery agent may represent an entire subnet including the router logic between subnets, whereas an endpoint agent may represent a host computer executing a distributed application. In another case, a delivery agent is used to model a router between two delivery agents modeling subnets. Further, a delivery agent's logic can be used to model the behavior of many different kinds of routers, because a delivery agent provides a readily alterable generic underlying behavior. It is not even necessary to understand the details of how a particular router and/or subnet works. Rather, if enough information is known about its' behavior to create a meaningful description, then the model will produce the desired behavior. But the delivery agent is general enough to be changed to model other behaviors. For example, one delivery agent is modeled to run slow to see how it affects aggregate network behavior, another delivery agent is modeled to drop messages, to see how that affects network behavior.

Figure 2:
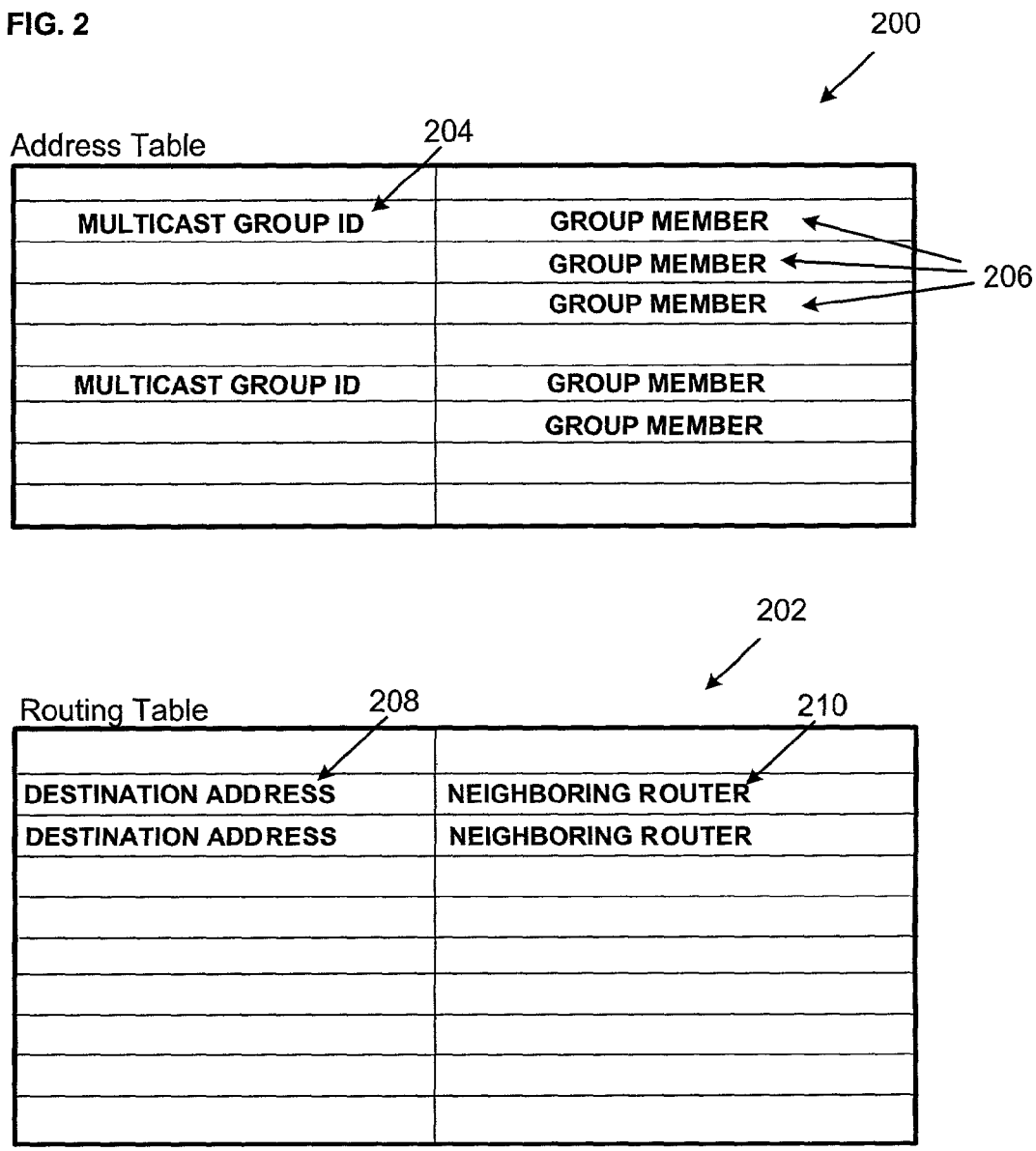
FIG. 2 is a diagram of data structures used to direct messages received by a delivery agent.

With reference to FIG. 2, a delivery agent of an illustrated embodiment has access to one or more data structures, that are used to determine what to do with a received message. A router's behavior is modeled with data structures that hold information used to determine what to do with a received message. Thus, a network of delivery agents can communicate through a topology represented in (for example) a routing data structure and/or address data structures of the communicating delivery agents. And these delivery agents are connected to local endpoints agents, and as such, may deliver messages directed to those local endpoint agents.

An address table 200, in this case modeling TCP/IP, is mapping addresses to multicast groups or related groups. So when a message arrives with a certain multicast address, it goes through this table and is split into a limited broadcast, and repeated until an address (endpoint agent) is local. Then it is delivered to the local address.

Since a received message is not for a delivery agent, it should be forwarded and eventually be received by an endpoint. The address table 200 is used to tell the delivery agent what to do with the message under a TCP/IP protocol. But given another protocol, the delivery agent needs to provide the minimum behavior necessary for that protocol. For all arriving packets, the delivery agent needs the minimum abstract behaviors to represent a modeled protocol. Address tables and routing tables 202 are known in the art. See Comer, D. E., Internetworking with TCP/IP, Principles, Protocols, and Architectures, Prentice Hall, 2000.

The abstract state machines (ASMs) which model agents, provide the ability to abstract away external behavior. In this case, the abstract state machine needs to determine whether a received message is ready to be delivered. In this simulation environment, flags can be used to show that a message is ready to be delivered. In another embodiment, time is added in order to model time dependent behaviors. For example, it is desirable to model delivering messages with delay, in order to fake the behavior of a delayed network. These and other simulation variables are discussed later in context of the UPnP model.

In one embodiment, the universe of agents executing the sequential abstract state machines are modeled on one computers. The abstract state machines can be run with threads, or concurrency can be created with interleaving. Interleaving is a module that selects a next abstract state machine to execute from a universe of selectable abstract state machines. In such a case, a selected abstract state machine (e.g., endpoint agent, delivery agent, etc.) completes a series of sequential instructions before another abstract state machine is selected. In another case, the universe of agents are run on a distributed group of computers.

Figure 3:
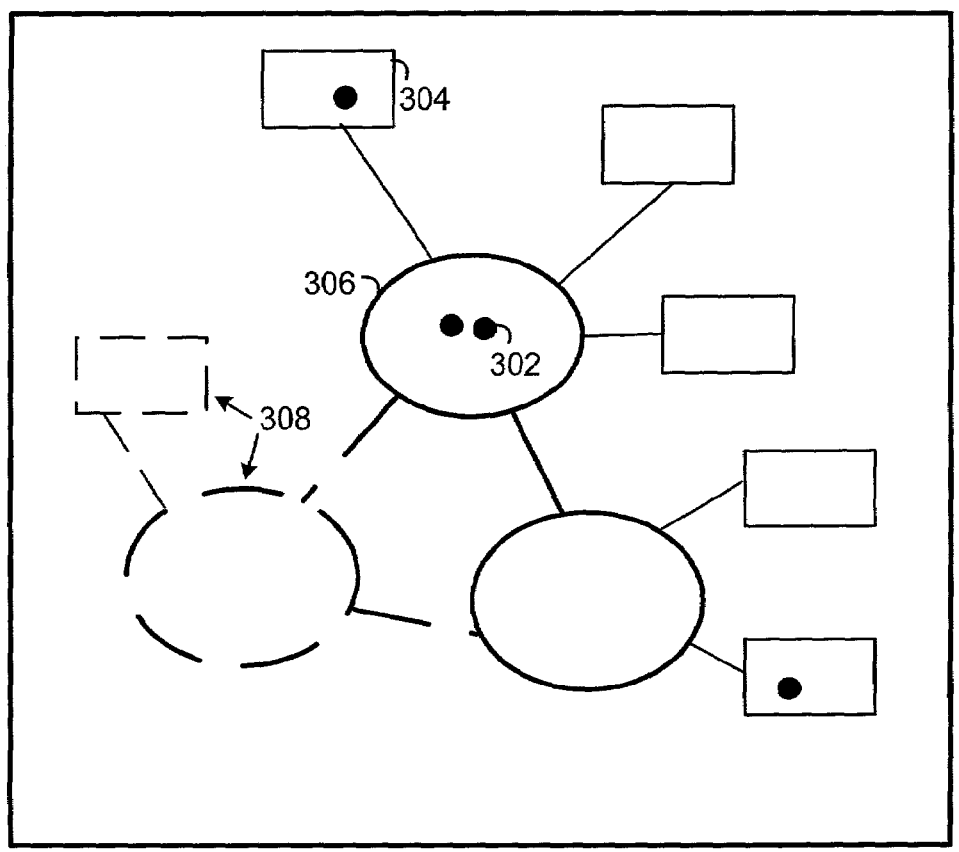
FIG. 3 is a graphical user interface depicting a dynamic visual representation of the network simulation.

With reference to FIG. 3, in one embodiment, a graphical user interface is used to display a graphical representation of the agents, and from the display it may appear that they are running concurrently for human visual consumption. Messages 302, endpoint agents 304, and delivery agents 306 are observed in creation and movement. Further, the executing agents and the executing environment is programmed to accumulate metrics to measure simulated behavior. These metrics are reported back at the end of the model run and used to evaluate the results of a proposed network behavior or to evaluate the network effects of a proposed modification.

The interface presents the current state of the universe of agents, or some section thereof. The simulation progression pace can be varied to observe with specificity, can be observed one step at a time, or can be observed as concurrent interrelated asynchronous behavior. In one such case, an on-screen icon is provided to make a next move. In a subtle variation therefrom, the system will choose one of the ASMs to make a possibly random move. In one such embodiment, the choose operator chooses non-deterministically. Such a choice can for example be made randomly from a universe of choices laid out in the specification. The universe of agents are viewed in a start state, and observable as agents are possibly added and removed 308.

In order to illustrate the versatility of a generic network simulation model within the context of an illustrated embodiment, a standard for a peer-to-peer network connectivity for intelligent appliances, wireless devices, and PCs, is modeled. The illustrated embodiment models the Universal Plug and Play Device Architecture (UPnP). The model is described in an executable abstract state machine language called (AsmL). AsmL provides a modern specification environment that is object-oriented and component-based. AsmL is a high-level executable specification language based on the concept of Abstract State Machines (ASMs). AsmL effectively supports specification and rapid prototyping of object oriented and component oriented software. See Gurevich, Y., et al., AsmL: The Abstract State Machine Language, Version 1.5, Microsoft Corporation, May 21, 2001.

The main strength of ASMs in general and AsmL in particular is their precise, rigorously defined semantics together with an application oriented view of specification as a practical tool for systems design and reverse engineering. Based on an abstract operational computation model, ASM specifications often look like pseudo code over abstract data structures. As such, they are easy to read and understand by system engineers and program developers. Moreover, practical experiences with industrial applications helped to establish a pragmatic understanding of how to model complex system behavior with a degree of detail and precision as needed.

UPnP is a distributed, open networking architecture that leverages TCP/IP and the Web technologies to enable seamless proximity networking in addition to control and data transfer among networked devices in the home, office and public spaces. The illustrated embodiment which simulates the UPnP architecture is concurrent, interactive, and real-time dependent. See UPnP Device Architecture V1.0, Microsoft Universal Plug and Play Summit, Seattle 2000, Microsoft Corporation, January 2000.

Unlike traditional engineering disciplines, like mechanical or electrical engineering, systems engineering heavily relies on informal documentation. Such informal documentation is necessary and, as in the case of UPnP, may be informative and useful. Still, informal documentation is informal and thus may be and often is ambiguous, incomplete, and even inconsistent. Properly constructed, mathematical models are consistent, avoid unintended ambiguity and are complete in the appropriate sense. In contrast with informal documentation, these mathematical models are executable and so they are used to explore and test the design. So, proposed designs or subsequent proposed changes are validated, and tests suites are used to verify performance expectation before the expense of implementation.

In constructing a simulation, the goal is to determine those details that are irrelevant for the understanding of the principle protocol behavior. To figure out what is relevant and what can be neglected is often not trivial and sometimes impossible without consulting the application domain experts.

In this case, the UPnP architecture is a layered protocol architecture built on top of TCP/IP networks by combining various standard protocols, e.g., DHCP, SSDP, SOAP, GENA, etc. It supports dynamic configuration of any number of devices offering services requested by control points. To perform certain control tasks, a control point needs to know what devices are available (i.e. reachable over the network) and what services these devices advertise.

UPnP devices (endpoint agents) may come and go at any time with or without prior notice. Consequently, there is no guarantee that a requested service is available in a given state or will become available in a future state. An available service may not remain available until a certain control task using this service has been completed.

Control points and devices (endpoint agents) interact through exchange of messages over a TCP/IP network (delivery agents), where specific network characteristics (like bandwidth, dimension, reliability) are left unspecified. As such, communication is considered to be neither predictable nor reliable, meaning message transfer is subject to arbitrary and varying delays and certain messages may even get lost.

The UPnP protocol defines 6 basic steps or phases. Initially, these steps are invoked one after the other in the order given below, but may arbitrarily overlap afterwards.

1. Addressing is needed for obtaining an IP address when a new device is added to a network.

2. Discovery informs control points about the availability of devices and their services.

3. Description allows control points to retrieve detailed information about a device and its capabilities.

4. Control provides mechanisms for control points to access and control devices through well-defined interfaces.

5. Eventing allows control points to receive information about changes in the state of a service at run time.

6. Presentation enables users to retrieve additional device vendor specific information.

Figure 4:
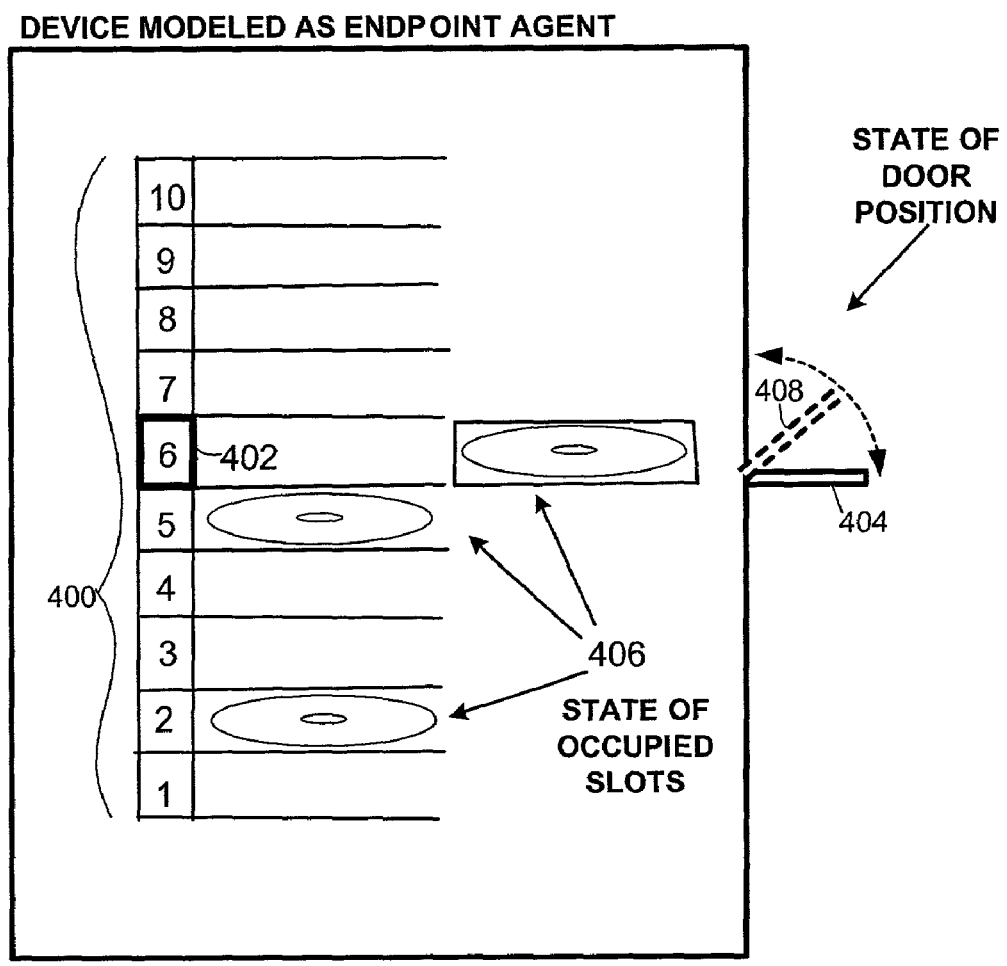
FIG. 4 is a diagram depicting a network device.

With reference to FIG. 4, a sample UPnP device (endpoint agent) is considered. This device has two different services, called ChangeDisc and PlayCD. The UPnP device allows a Control Point (endpoint agent) to add or remove discs from the CD player, to chose a disc to be placed on the tray, and to toggle (open/close) the door. In this example, a modeled UPnP device may contain state data for the device slots 400, the current slot 402, whether the door is open 404, whether the door is jammed 408, and which slots are occupied 406.

In general, for a given abstract state machine (ASM) A, that is defined over a fixed vocabulary V, some finite collection of function names and relation names exist. The relations may be represented as Boolean valued functions; however, it is convenient to make this distinction. Names in V may be marked as static indicating that they have the same interpretation in all states of A. Non-static names are called dynamic.

States of A are first-order structures with a fixed common base set. Different states may interpret dynamic names of V in different ways over the same base set. Unary relations defined on the base set have a special role; they can be interpreted as universes, or domains, classifying the objects under consideration. To represent additional computational resources, the base set contains a potentially infinite set, the reserve. Elements from the reserve serve to extend dynamic universes at run time.

Figure 5:
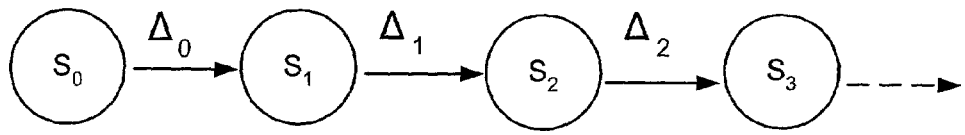
FIG. 5 is a diagram depicting possible state transitions in terms of finite sets of local function updates.

With reference to FIG. 5, and given a vocabulary, the ASM A is defined by its program P and a set of distinguished initial states $S_o$. The program P specifies possible state transitions of A in terms of finite sets of local function updates on a given global state. Such transitions are atomic actions. Starting from an initial state, executions of P produce finite or infinite runs (where the $\Delta_i$ refer to updates sets).

A program P consists of transition rules, and complex rules are defined inductively as a composition of basic update instructions using a few simple rule constructors. A basic update instruction operates on a given function f and has the general form $f(t_1, t_2, \ldots, t_n):=t_0$, where the $t_i$'s (i=0, ..., n) are ground terms. The effect of this instruction is a local value assignment, where the value of f at the given location identified by $t_1, t_2, \ldots, t_n$ is replaced by the value denoted by $t_0$.

The canonical rule constructor is the block construct, also called "do in-parallel", which allows for the synchronous parallel composition of rules. The general form is R::=do in—parallel R1 R2, where the "do in-parallel" part is optional (and usually is omitted). The update set computed by R over a given state is defined to be the union of the individual update sets as associated with R1 and R2 respectively.

The following ASM program (written in AsmL) shows the part of the specification of the ChangeDisc service that is executed when invoked with the "AddDisc" action. The declarations of the function names are as follows, where all but SLOT and AllSlot are declared as dynamic. The following style will be used to highlight AsmL code.

universe SLOT
DiscSlots as Set of SLOT
var OccupiedSlots as Set of SLOT
var DoorIsStuck as Boolean
var DoorIsOpen as Boolean
var CurrentSlot as Integer Upon invocation of the AddDisc action, the door of the CD player is opened (unless stuck) and one of its unoccupied slots (if any) is made current. The non-deterministic choose construct chooses some available slot. Notice that this is a specification of all the allowed behaviors. When this specification is executed, the choice is made randomly. However, any particular implementation conforming to this specification could use some deterministic algorithm for choosing an empty slot.

```
AddDisc ( ) =
    let emptySlots = DeviceSlots-OccupiedSlots
    if not (DoorIsStuck or emptySlots={})then
        DoorIsOpen := true
        choose slot in emptySlots do
            CurrentSlot := slot
    else
        raise error condition
```

The following do-for-all is another key control construct of ASMs. The following hypothetical modeled action removes all currently occupied slots in a single transaction.

```
RemoveDiscs ( ) =
    forall s in OccupiedSlots do
        OccupiedSlots(s) := false
```

In order to simplify modeling and to stay close to the informal understanding, AsmL provides a rich background structure. In particular, dynamic sets and maps are used in the illustrated embodiment. Both maps and sets are viewed as aggregate entities and are updated point-wise, for instance, as done for OccupiedSlots in the above example.

In this embodiment, for dealing with real-time constraints, a discrete notion of time is employed to abstractly represent time in a distributed system as global system time. Time values are represented as real numbers by the elements of a linearly ordered domain TIME. One can assume here that TIME is a subset of the real numbers and define the relation "$\geq$" on time values through the corresponding relation on real numbers. This notion of time is based on the view that one can only observe, but not control, how physical time evolves. Accordingly, a nullary function "now" is introduced for taking values in TIME.

var now as TIME

Thus, "now" represents the global system time as measured by some discrete clock. One can reasonably assume that the values of now change monotonically over ASM runs. This way, timeout events are modeled through timer mechanisms that refer to the global system time. In a real-time context it is appropriate to assume that rules are fired instantaneously, i.e. as soon as a state is reached in which the rules are enabled. (Strictly speaking, one must assume here some non-zero delay to preserve the causal ordering of actions and events; though, this delay is immaterial from an application point of view).

A distributed ASM consists of a collection of autonomously operating agents interacting through globally shared states. Cooperatively these agents perform some distributed computation based on a concurrent execution model, where the computation steps of the individual agents are atomic actions. The underlying semantic model regulates interaction between agents so that potential conflicts are resolved according to the definition of partially ordered runs. See Gurevich, Y., Evolving Algebras, 1993: Lipardi Guide, Specification and Validation Methods, Oxford University Press, 1995, 9–36.

Agents are elements of a dynamic universe AGENT. Each agent has an ASM program defining its' behavior. A distinguished nullary function "me" is used as a self-reference for agents. When a new agent is introduced at run time, some program (Program(me)) from a statically defined set of programs is assigned to that agent.

Any interaction between the model and the external world, as observable at the respective interfaces, is reduced to interaction between two different categories of agents: (1) explicitly defined agents of the model, and (2) implicitly given agents of the environment. The non-deterministic nature of environment agents naturally reflects the system view of the external world. Thus the environment may also affect state transitions by altering dynamic functions. However, this does not mean that the environment behaves in a completely unpredictable way; rather one can formulate reasonable integrity constraints on external actions and events where appropriate.

In order to execute a specification modeling a distributed ASM written in AsmL, a top-level scheduling loop can be used to interleave the agents. Such a scheduler is defined as follows.

```
RunToplevel( ) =
    choose a in AGENT do Program (a)
```

Turning now to a UPnP simulation, an illustrated embodiment for the construction of an abstract UPnP protocol model is a distributed real-time ASM consisting of an arbitrary number of asynchronously communicating components. In such a case, a component either represents a device (endpoint agent), a control point (endpoint agent) or some fraction of the underlying communication network (delivery agents). With each component type is associated one or more interfaces such that any interaction between a component and any other component is strictly restricted to actions and events as observable at these interfaces. Additionally, actions and events in the external world, the environment into which the system under consideration is embedded, may affect the system behavior in various ways. For instance, the transport of messages over the communication network is subject to delays and sometimes messages may even get lost. Also, the system configuration itself may change as devices come and go. Such actions and events are basically unpredictable. Consequently, an additional GUI is introduced, that allows for user-controlled interaction with the external world.

Figure 6:
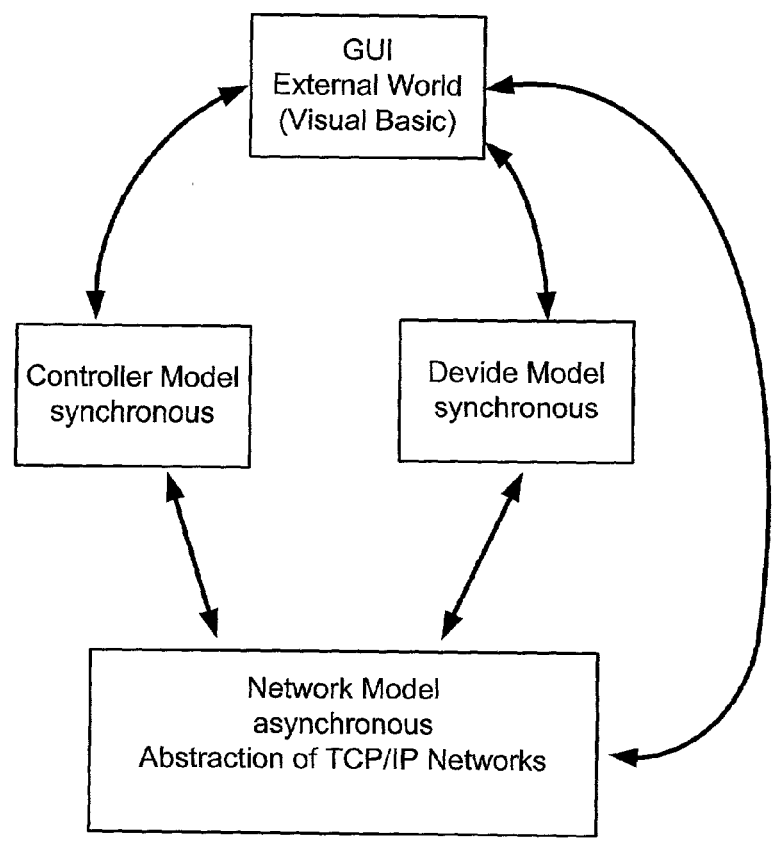
FIG. 6 is an organizational block diagram depicting endpoint agents, delivery agents, and a graphical user interface module.

With reference to FIG. 6, an overall organization of an illustrated embodiment is considered. At the component level, control points and devices are further decomposed, where each individual component splits into some collection of synchronously operating functional units. This decomposition is such that each of the resulting units participates in a different protocol step. Accordingly, control points and devices are modeled as parallel compositions of synchronously operating ASMs.

Since UPnP is supported by TCP/IP, an abstraction of TCP/IP is used to model network behavior. The illustrated network model is based on a distributed execution model faithfully reflecting the fact that a TCP/IP network usually consists of some (not further specified) collection of interconnected physical networks. By abstracting away from topological details, e.g. how a global network is formed by interconnecting local networks by means of routers (or gateways), network behavior is described through a collection of concurrently operating communicators (delivery agents), each of which refers to some local network in conjunction with its adjacent routers. This separates the behavior of the network and its routers (delivery agents) from the behavior of the hosts (endpoint agents), as illustrated in FIG. 1.

Based on the two standard transport level protocols the User Datagram Protocol (UDP) and the Transmission Control Protocol (TCP), user level processes, or application programs, interact with each other by exchanging messages over the network. According to this view, there are several application programs running on a single host (endpoint agent). The address of an application program is given by the IP address of its host in conjunction with a unique protocol port number on this host. In this case, several control point programs may run on the same host. Devices, however, are considered as individual hardware units; therefore they are identified with the hosts on which they run.

For this illustrated UpnP model, the main types of agents are the following.

```
universe AGENT
    universe COMMUNICATOR    //In this case, an delivery agent
    universe CONTROLPOINT    //In this case, an endpoint agent
    universe DEVICE          //In this case, an endpoint agent
```

The Dynamic Host Configuration Protocol (DHCP) enables automatic configuration of IP addresses when adding a new host to a network. Interaction between a DHCP server and the DHCP client of a device is modeled explicitly only as far as the device side is concerned. The server side is abstractly represented through one or more external DHCP server agents whose behavior is left implicit. In this model, the DHCP server represents another type of application program.

universe DHCPSERVER

Control points, devices and DHCP servers are collectively called applications. The applications and the communicators are modeled as autonomous agents.

APPLICATION=CONTROLPOINT∪DEVICE∪DHCPSERVER

AGENT=APPLICATION∪COMMUNICATOR

Figure 7:
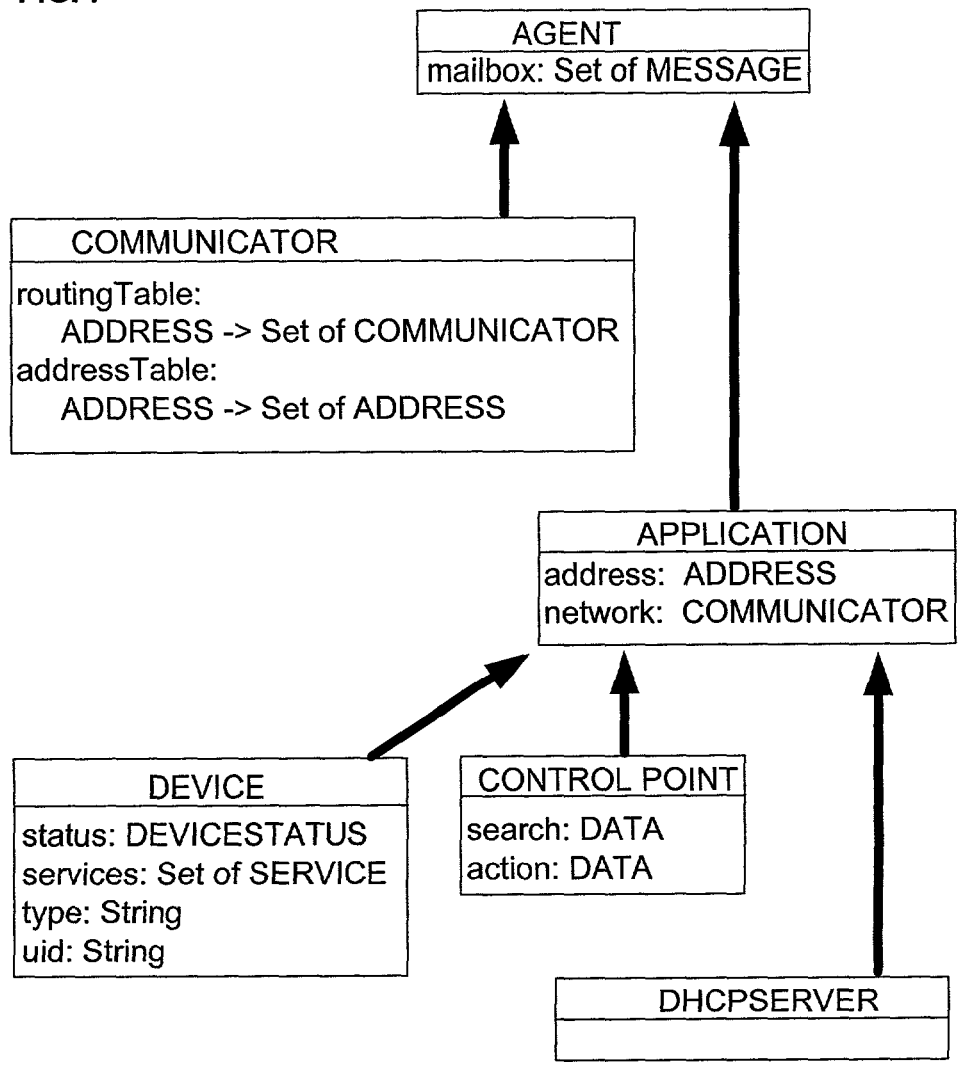
FIG. 7 is a UML class diagram depicting the various agent types and the relations between them.

An overview of the various agent types and the relations between them is presented in the form of a UML class diagram in FIG. 7.

A universe DURATION represents finite time intervals as differences between time values.

universe DURATION

An agent may employ several distinct timers for different purposes. Each individual timer t has its own predefined duration effectively determining the expiration time when setting t. In a given state, a timer t is active if and only if its expiration time time(a,t) is greater than the value of now. Otherwise, t is said to be expired.

universe TIME = {discovery, . . . }
duration (me as AGENT, t as TIMER) as DURATION
var time (me as AGENT, t as TIMER) as TIME For a given timer t of an agent, the operation of setting t is defined as follows.

```
SetTimer (me as AGENT, t as TIMER) =
    time (me, t) := now + duration (me, t)
```

In a given state, a predicate Timeout indicates for a given timer t and agent me whether or not t has expired.

```
Timeout ( me as AGENT, t as TIMER ) as Boolean =
    now ≧ time (me, t)
```

This illustrated embodiment defines the representation of addresses and messages together with the mechanisms for sending and receiving messages. The model abstractly reflects the view of the transports TCP and UDP. At the given level of abstraction, the actual difference between TCP and UDP is that the former is reliable whereas the latter provides a best-effort, connectionless packet delivery service, i.e. message may get lost, duplicated or received out of order.

A static universe ADDRESS of IP addresses is introduced, extended by protocol port numbers to refer to the global TCP/UDP address space. Each application under consideration has a dynamic function "address" identifying an element from ADDRESS.

universe ADDRESS
var address (me as APPLICATION) as ADDRESS

When a new device is added to the network, it does not yet have an IP address, but uses its hardware address for communication with a DHCP server. Hardware addresses are modeled as follows:

universe HWADDRESS
hwAddress (me as DEVICE) as HWADDRESS

In this embodiment, messages are uniformly represented as elements of a dynamic universe MESSAGE. Each message is of a certain type from the static universe MSGTYPE. The message type in fact determines whether a message is to be transmitted using UDP or TCP, though this distinction is not made explicit here.

universe MESSAGE initially { }
universe MSGTYPE={advertisement, revocation, . . . }

A modeled message of this embodiment uniquely identifies a sender, a receiver, a message type, and the actual message data, or payload. In this case, the payload is any finite representation of data to be transferred from a sender to a receiver. To limit the maximum number of routers that a message can pass on its way from the sender host to a destination host, a time-to-live or TTL, is assigned when the message is created (UPnP defines the initial TTL to be 4).

universe DATA
var suck (me as MESSAGE) as ADDRESS
var rcvr (me as MESSAGE) as ADDRESS
var type (me as MESSAGE) as MSGTYPE
var data (me as MESSAGE) as DATA
var ttl (me as MESSAGE) as {0, 1, 2, 3, 4}

An application is running on some host (endpoint agent) connected to one or more local networks (delivery agents). The operation of sending a message as well as the delivery of a message both require some form of direct interaction between this host and one of its local networks. In this case, it is assumed that the network is uniquely determined by the application.

network (me as APPLICATION) as COMMUNICATOR

In this embodiment, an agent models a local mailbox for storing messages until these messages will be processed. According to this view, the mailbox of a communicator (delivery agent) represents the set of messages that are currently in transit on the related network and its routers. The mailbox of an application represents its local input port as identified by the respective port number for this application.

var mailbox (me as AGENT) as
Set of MESSAGE initially { }

An embodiment representing a high-level ASM model of the UPnP protocol is now considered. An initial state reflects the particular system configuration under consideration and identifies some finite collection of a priori given agents, one for each control point (endpoint agent), each device (endpoint agent) and each communicator (delivery agent).

Assume that both TCP and UDP are used as protocols for the transfer of messages between applications running on different machines. Since UDP is based on the same unreliable datagram delivery semantics as IP, it is in the responsibility of an application to tolerate this behavior.

Collectively, the communicators solve the task of globally transferring messages between applications running on hosts connected to the network. Communicators thus imitate the behavior of IP routers, where the network topological information is encoded in two separate tables, an address table 200 and a routing table 202.

For this embodiment, an address table is employed, and this address table is a mapping from addresses of multicast groups 204 to addresses of related group members 206. Some of the resulting addresses are local, some not.

addressTable ( me as COMMUNICATOR,
   a   as ADDRESS          ) as Set Of ADDRESS Whereas, the routing table of this embodiment maps non-local addresses 208 to the correct neighboring communicators (delivery agents) 210.

routingTable ( me as COMMUNICATOR,
   a   as ADDRESS          ) as COMMUNICATOR

For this embodiment, the transfer of messages may be delayed in an unpredictable manner depending on resource limitations of the underlying physical network. In this model, the decision of whether a messages is ready to be delivered in a given state of the network is expressed through a unary predicate defined for a message and called ReadyToDeliver. Further, for some UDP messages, the condition ReadvToDeliver(m) may never hold, implying that the message effectively gets lost.

var ReadyToDeliver (me as MESSAGE) as Boolean

For this embodiment the program of a communicator (delivery agent) performs three different steps: 1) limited broadcasting within the local network; 2) delivery of multicast messages on a local network; 3) routing of messages through a global network. To identify local networks, a unique network identifier, called the netid, is associated with each communicator. The network identifier can be derived from an IP address by inspecting the network mask that is part of the address.

universe NETID
netid ( me as COMMUNICATOR ) as NETID
netid ( a   as ADDRESS      ) as NETID A communicator is responsible for delivering messages that are ready to be delivered, in which case the message is removed from the mailbox.

In the illustrated AsmL rules below, global rule macros support modular descriptions and stepwise refinements. Formally, such macros are syntactic abbreviations that often are parameterized. That is, each occurrence of a macro within a rule is to be replaced by the related macro definition, effectively replacing formal parameters with actual ones.

Program ( me as COMMUNICATOR ) =
   choose msg in me.mailbox where ReadyToDeliver ( msg ) do
     me.mailbox( msg ) := false
     Deliver(me, msg )

This above algorithm describes one atomic step of a delivery agent, and this atomic step is run over and over again. First, a delivery agent chooses a message from it's in-box that is ready to be delivered. Then it delivers the message. Ready to deliver creates the opportunity to incorporate time into simulated network behavior. Again, note that the entire network (delivery agents and endpoint agents) can be simulated on one machine.

Delivery can either mean limited broadcasting, or the destination address is resolved, using the address table, to a set of outbound addresses. Each of those addresses is either local or non-local.

```
Deliver ( me as COMMUNICATOR, msg as MESSAGE ) =
    if msg.rcvr = broadcast then
        Broadcast ( me, msg )
    else
        forall adr in addressTable ( me, msg.rcvr ) do
            if netid ( adr ) = me.netid then
                DeliverLocally ( me, msg, adr )
            else
                Route ( me, msg, adr )
```

Specifically, what it means to deliver a message is network specific. The illustrated delivery behavior is intended to model some aspects of TCP/IP. First, the above algorithm checks to see if the message is broadcast. If so, the message is broadcast, otherwise, it looks up all the addresses in the address table, that the message corresponds to, and if the corresponding address is local (meaning the network identification (netid) is the id of the local communicator), then the message is delivered locally, otherwise, the message is delivered to a delivery agent(s) as determined by the routing table.

When a message is indicated as broadcast, the message is delivered to all endpoints that are local. Limited broadcasting implies delivery to all local applications.

```
Broadcast ( me as COMMUNICATOR, m as MESSAGE ) =
    forall app in APPLICATION where app.network = me do
        DeliverMessage ( m, app.address, app )
```

Local delivery of a message is accomplished by finding out the local destination and delivering the message to it.

```
DeliverLocally ( me as COMMUNICATOR, msg as MESSAGE, adr as ADDRESS ) =
    choose app in APPLICATION where app.address = a do
        DeliverMessage ( msg, adr, app )
```

A message is routed to a neighboring communicator only if its TTL is greater than 0.

```
Route ( me as COMMUNICATOR, msg as MESSAGE, adr as ADDRESS ) =
    if ttl ( msg ) > 0 then
        let c = routingTable ( me, adr )
        if c ≠ undef then
            DeliverMessage ( msg, adr, c )
```

In this embodiment, the operation of delivering a message to the mailbox of a given agent is defined below. Applications (endpoints agents) and communicators (delivery agents) are treated uniformly. They are both agents that have a mailbox and the operation performed on this mailbox (i.e., inserting a copy of some message) does not depend on the particular type of agent.

```
DeliverMessage ( msg as MESSAGE, adr as ADDRESS, agt as AGENT ) =
    let m = new MESSAGE
        m.sndr := msg.sndr
        m.rcvr := adr
        m.data := msg.data
        m.type := msg.type
        m.ttl := msg.ttl − 1
        agt.mailbox := agt.mailbox ∪ {m}
```

The above program describes one atomic step of a communicator (delivery agent). In a particular network model there may be one or more concurrently operating communicators. Note that only adjacent communicators may directly interact with each other by inserting messages into each others mailboxes. Adjacency here is defined by the routing tables.

An illustrated device model (endpoint agent) abstractly describes the UPnP protocol core. The status of a device is one of the following three modes, where byebye means that the device is about to become inactive.

universe DEVICESTATUS = { inactive, alive, byebye }
var status (me as DEVICE) as DEVICESTATUS The device program (endpoint agent ASM) handles all the protocol phases (all of which may overlap with each other).

```
Program ( me as DEVICE ) =
    if me.status ≠ inactive then
        RunAddressing ( me )
        RunDiscovery ( me )
        RunDescription ( me )
        RunControl ( me )
        RunEventing ( me )
        RunPresentation(me)
```

Every device is connected to a set of services through abstract service interfaces.

universe DEVICESTATUS = { inactive, alive, byebye }
var status (me as DEVICE) as DEVICESTATUS One of the (endpoint agent) UPnP protocol phases are shown here, however others can viewed in the technical report. See V. Glasser, Y. Gurevich and M. Veanes, Universal Plug and Play Machine Models, Microsoft Research MSR-TR-2001, Jun. 15, 2001. The control part executes only is if the device has an address. It then handles some request that has a matching service by calling the corresponding service and deletes that request.

```
RunControl ( me as DEVICES ) =
    if me.adr ≠ undef then
        choose msg in me.mailbox,
            s  in me.srvcs where
                IsServiceRequest ( msg, s ) do
                    CallService ( msg, s )
                    me.mailbox ( msg ) := false
```

ASML is considered by some to be a software architecture language (ADL). An ADL must provide means for explicit specification of the building blocks of an architectural description. The building blocks are 1) components, 2) connectors, and 3) configurations, Components in AsmL are ASMs together with a collection of interfaces defining the interaction points with the environment. The interfaces may be declared as native COM interfaces, automation interfaces or abstract model interfaces, depending on their usage. For example, in the UPnP model, device models are components that interact with the communicator through abstract model interfaces and with the GUI through automation interfaces.

Connectors are special components for modeling the interaction of other components. Their behavior is clearly separated from the core behavior of the model. For example, in the UPnP model the communicators are the connectors; indeed they do not reflect any UPnP specific behavior.

Configurations describe the architectural structure of the system, i.e. the topology of the components. In AsmL, configurations are normally described explicitly in the state. For example, the address table and the routing table in the UPnP protocol constitute the configurations. However, AsmL does not have an explicit configuration sub-language, which is seen as a counter-argument for AsmL being classified as an ADL.

The main strength of AsmL is the unified semantic model based on ASMs. This is in contrast to many existing ADLs, which lack formal semantics completely, or use different formal semantics for components vs. connectors. A rigorous semantics is often a prerequisite for many tool generators. AsmL specifications are used for automatic test case generation, conformance checking, and to provide behavioral interfaces for components. See W. Grieskamp, Y. Gurevich, W. Schulte and M. Veanes. Testing with Abstract State Machines. In *Proc. ASM'2001*; M. Barnett, C. Campbell, W. Schulte, and M. Veanes. Specification, simulation and testing of COM components using Abstract State Machines. In Formal Methods and Tools for Computer Science, Eurocast 2001, pp. 266–270. IUCTC Universidad de Las Palmas de Gran Canaria, February 2001; M. Barnett, L. Nachmanson, and W. Schulte. Conformance checking of components against their non-deterministic specifications. Technical Report MSR-TR-2001-56, Microsoft Research, June 2001; M. Barnett and W. Schulte. The ABCs of Specification: AsmL, Behavior, and Components, Informatica, to appear in 2002.

In another embodiment of a high-level abstract state machine, a couple of variations are examined. For example, in the following algorithm a subset of messages that are ready to be delivered are chosen to be delivered by a delivery agent in a single step. Further, the address table and the routing table are represented by the mappings ResolvedMessages(m) and Recipient(m). Instead of mapping an address to a set of addresses, ResolvedMessages(m) maps a message to a set of messages. The following algorithm may be considered more abstract than the above algorithm.

In this embodiment, a special type of agent called a delivery agent that is responsible for transforming messages and then forwarding the transformed messages to other agents. As before, the following specification language is AsmL.

class DeliveryAgent extends Agent

The intuition behind delivery agents is a graph of nodes in a communication network. FIG. 1 is employed to indicate a typical topology consisting of two neighboring local networks 102, 106. Note that delivery agents 102 are themselves agents. In other words, they interact by asynchronously processing messages from their own mailboxes. What distinguishes delivery agents from other kinds of agents is their knowledge of local network topology, i.e., a set of locally visible agents that may receive messages.

Thus, one can think of delivery agents as an abstract kind of "router" of messages. However, note that the term "router" used in this sense is much more general than the corresponding TCP/IP term. In the following paragraphs (prior to the discussion of FIG. 8), various aspects of the delivery agent's operation are discussed and then a control program that integrates these aspects is presented.

In this embodiment, not all messages have a single recipient. Some messages are intended to be sent to many recipients. However, multicasting is just one example of a general class of message preprocessing. Other transformations include incrementing a hop count for time-to-live calculations and encryption.

```
class DeliveryAgent . . .
    ResolvedMessages(m as Message) as Set of Message = {m}
```

The ResolvedMessages( ) method transforms a message from its raw input form to the form that will eventually be forwarded by the delivery agent. For example, the transformation may involve adding or removing header information or multiplexing a multicast message into separate "unicast" messages. The model places no restriction on the kind of transformation performed in this step. Headers and payload data may be freely altered. It is even permitted that a transformation may "eat" a message by returning an empty set. By default, it is assumed that no special processing is needed (that is, the ResolvedMessages( ) method is an identity operation, returning a single-element set containing the input message).

Delivery agents determine the recipient of a message by examining addressing information contained in the message's headers and reconciling that information with the delivery agent's knowledge of network topology.

```
class DeliveryAgent . . .
    Recipient(m as Message) as Agent = undef   // routing fn
```

The Recipient( ) method of the DeliveryAgent class identifies which agent would receive a given (transformed) message if that message were to be forwarded by the delivery agent. The recipient may be any agent—either a "leaf" node in the network or another delivery agent that will forward the message further. For example, in the case of TCP/IP, applications running on hosts can be thought of as agents that receive messages forwarded to them by the various "subnet" agents that comprise the TCP/IP network.

In real-world distributed systems, there are complex conditions that govern when (or if) a message is forwarded. These might include network latency and security parameters.

```
class DeliveryAgent . . .
    ReadyToDeliver(m as Message) as Boolean = true //external fn
```

This embodiment abstracts all of the timing and security issues into an "external" function called ReadyToDeliver( ). If the method returns the value true for a given message, then the message will be deemed available for processing. Note that messages that are never ready to deliver are in effect "lost," even though they persist in the delivery agent's mailbox.

For this embodiment, an algorithm for how delivery agents route messages to other agents is now considered. The Run( ) method of the Agent class represents the control program that will be invoked whenever the agent is active.

```
class DeliveryAgent . . .
    Run( )
        availableMsgs =
            {m | m in me.mailbox where me.ReadyToDeliver(m)
        selectedMsgs =
            ChooseSubset(availableMsgs)
        forall msg in selectedMsgs
            me.RemoveFromMailbox(msg)
            forall m in ResolvedMessages(msg)
                a = me.Recipient(m)
                if a <> undef then   //if recipient found
                    require m = msg implies a <> me
                    a.AddToMailbox(m)
                else
                    skip   //else, ignore message
```

The control program of a delivery agent (its "Run( )" method) forwards messages found in its mailbox by adding them to the mailboxes of the messages' respective recipients.

The non-deterministic algorithm proceeds as follows. First, the delivery agent determines the subset of unprocessed messages that are ready to be delivered. The definition of the local variable availableMsgs can be read as "the set of all m such that m is an element of the set me.mailbox and where the predicate me.ReadyToDeliver, when applied to m, returns the value true." In other words, availableMsgs is the set of mailbox messages that are ready to be delivered.

Next, the delivery agent (non-deterministically) selects a subset of the available messages for processing in this step. Note that some, all, or none of the available messages may be selected for processing.

Next, the delivery agent transforms each selected message, as described above using ResolvedMessages( ). This may result in the unfolding of a single message into many messages, each of which will be posted to a single recipient (for instance, in the case of multicasting). Note that a recipient may be another delivery agent. Finally, the delivery agent calculates the recipient of each resolved message and adds the (transformed) message to the mailbox of the recipient.

A precondition asserts that the message's recipient cannot be the current delivery agent. The motivation for this restriction is that removing and adding the same message to a mailbox (in the same step) would constitute an inconsistent update. (If this behavior is desired, one would create a new message with an identical payload.) Note that AddToMailbox( ), allows for the possibility that the message will be rejected by its recipient or lost in transit. Also note that the aspects that have not been explicitly made sequential in the model are presumed to be concurrent. For instance, the processing of selected messages occurs in parallel.

A TCP/IP delivery agent is next defined to model the propagation of packets across TCP subnets. The TCP subnet agent would have tables for translating multicast addresses into multiple unicast addresses and for routing (unicast) messages.

class TcpAddress

The following function returns the destination address of a given message.

MessageTcpAddress(m as Message) as TcpAddress

The following function creates a new message from a given message and a given destination address.

```
AddressedTcpMessage(m as Message, a as TcpAddress) as Message
class TcpSubnet extends DeliveryAgent
    multicastTable as Map of TcpAddress to Set of TcpAddress
    routingTable as Map of TcpAddress to TcpNode
    ResolvedMessages(m as Message) as Set of Message
        addr = MessageTcpAddress(m)
        if addr in dom(multicastTable) then
            return {AddressedTcpMessage(m, a) |
                a in multicastTable(addr)}
        else
            return {m}
    Recipient(m as Message) as Agent =
        return routingTable(MessageTcpAddress(m))
```

This view of TCP uses a flat address space. In other words, the routing and multicast tables contain individual entries for every address. Multicasting occurs in the ResolvedMessages( ) method. The method examines whether the message's address is in its table of multicast addresses (via the built-in domain testing function dom( )). The return expression can be read as "the set of all results of AddressedTcpMessage when applied to arguments m and all a such that a is an element of the set given by looking up addr in multicastTable." Thus, the method returns transformed messages for each unicast address that has been associated with the multicast address found in the original message. In the case that the address is not intended for multicast, the message is passed through without transformation.

Figure 8:
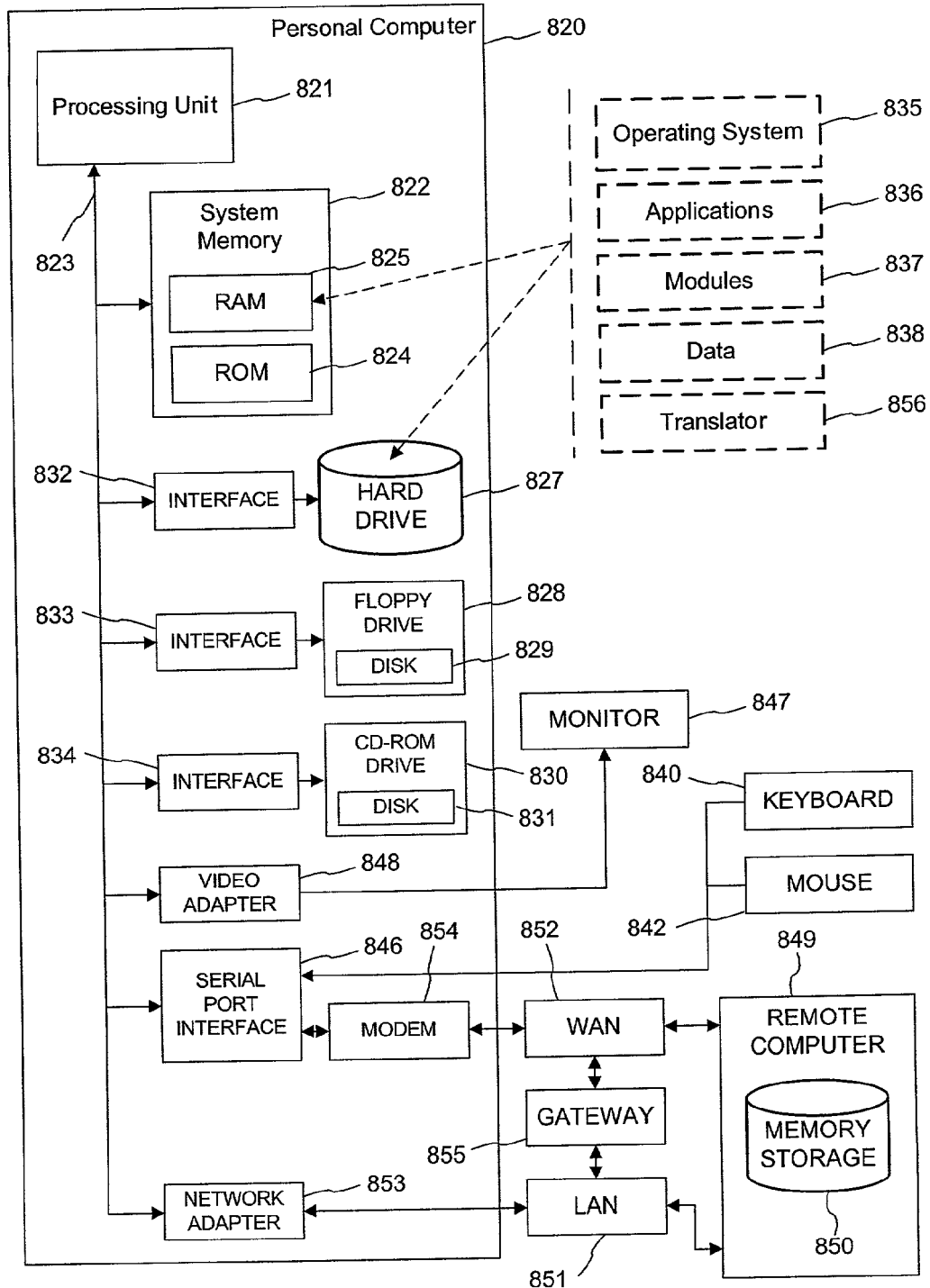
FIG. 8 is a block diagram of a computer system that may be used to implement the detailed description.

FIG. 8 and the following discussion are intended to provide a brief, general description of a suitable computing environment in which an embodiment is implemented. While the invention will be described in the general context of computer-executable instructions of a computer program that runs on a computer and/or computer printer, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, and the like. The illustrated embodiments of the invention also can be practiced in networked computing environments, or on stand-alone computers.

With reference to FIG. 8, an exemplary system for implementing the invention includes a conventional computer 820 (such as personal computers, laptops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, TDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838; in addition to an embodiment 856.

A user may enter commands and information into the computer 820 through a keyboard 840 and pointing device, such as a mouse 842. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

Having described and illustrated the principles of the invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of the invention may be applied, it should be recognized that the detailed embodiments are illustrative only and should not be taken as limiting the scope of the invention. Rather, we claim as our invention all such embodiments as may come within the scope and spirit of the following claims and equivalents thereto.

We claim:

1. A system for simulating network behavior on a computer comprising:
    plural executable abstract state machines each programmed to simulate an agents behavior according to simulated network conditions under test;
    at least some of said simulated agents create messages, plural of the created messages comprising at least four specific properties consisting of: message size, message type, message time-to-live, message sender, message receiver and message payload;
    at least some of said simulated agents deliver messages; and
    the simulated network behavior is represented by the aggregate state changes created by the individual simulated agents as the plural created messages pass through a dynamic simulated network topology according to the at least four specific properties.

2. A computerized system for simulating network behavior comprising:
    an abstract state machine language compiler for compiling a design specification into plural executable abstract state machine modules;
    an endpoint agent abstract state machine module operational to create plural simulated messages, each such message with a message destination property and to place the plural messages in a message box; and
    a delivery agent abstract state machine module operational to choose a message from a message box, to determine a message destination property for the chosen message, to determine a message disposition based on the message destination property in relation to a network topology, and to dispose of the chosen message;
    wherein two or more of the created simulated messages comprise at least three specific network simulation properties consisting of: message size, message type, message time-to-live, message sender and message payload.

3. The system of claim 2 further comprising:
    an interleaving module that selects a next endpoint agent or delivery agent for execution wherein the selection is made non-deterministically.

4. The system of claim 2 wherein the delivery agent models a router's behavior using data structures comprising an address table and a routing table.

5. The system of claim 2 wherein the delivery agent models a subnet's behavior wherein the subnet's behavior comprises at least a TCP subnet behavior and having tables for translating multicast addresses into multiple unicast addresses and for routing unicast messages.

6. The system of claim 2, further comprising:
a mapping function for mapping a message to an adjacent endpoint agent; and
a mapping function for mapping a message to an adjacent delivery agent according to a message delivery protocol comprising a TCP and UPD protocol.

7. In a computer system, a method of simulating the behavior of interacting network components, where behaviors of a network's components are described in a network design specification, the method comprising:
translating the network design specification into an executable specification comprising plural executable abstract state machines comprising plural delivery agents and plural endpoint agents;
creating by a first endpoint agent plural simulated messages and placing the messages in a message box associated with a first delivery agent and wherein two or more of the plural created simulated messages comprise at least four specific properties consisting of: message size, message type, message time-to-live, message sender, message destination, and message payload;
choosing by the first delivery agent from the message box, a simulated message;
determining a delivery destination for the simulated message by the first
delivery agent, said delivery destination determined using a mapping function including a network topology specific to the first delivery agent; and
forwarding by the first delivery agent the chosen message to a message box
associated with an agent determined with the mapping function;
whereby aggregate behavior of a dynamic network is modeled as plural messages pass through a network topology and wherein metrics comprising results of a proposed network are provided at the end of a network simulation.

8. The method of claim 7, wherein forwarding further comprises:
determining that the message has a broadcast property and forwarding the message to plural message boxes.

9. The method of claim 7, wherein choosing further comprises:
choosing the simulated message from amongst other simulated messages in the message box, based on a priority property assigned to the chosen message.

10. The method of claim 7, wherein the chosen message is forwarded to the message box of an adjacent local endpoint agent identifiable in an address table.

11. The method of claim 7, wherein the chosen message is forwarded to the message box of an adjacent delivery agent determined in a routing table.

12. The method of claim 7, wherein forwarding further comprises:
determining to forward the chosen message to the message box associated with an adjacent delivery agent based on the destination property value associated with the chosen message.

13. A computer-readable medium having thereon a computer-executable network communications simulation program comprising:
an endpoint agent abstract state machine module for creating and placing simulated messages in a message box wherein three or more of the simulated messages comprise at least four specific properties consisting of: message size, message type, message time-to-live, message sender, message destination, and message payload; and
a delivery agent abstract state machine module for choosing messages from a message box and for determining the disposition of the chosen message based on a destination property of the chosen message and a network topology represented by a mapping function available to the delivery agent;
wherein, the mapping function may direct the message disposition to a message box of a delivery agent or an endpoint agent.

14. The computer-readable medium of claim 13, wherein the mapping function is an address table for mapping addresses of multicast groups to addresses of related group members.

15. The computer-readable medium of claim 13, wherein the mapping function is a routing table mapping non-local addresses to neighboring delivery agents.

16. The computer-readable medium of claim 13, wherein a network identification number is associated with the delivery agent and is compared to a message destination value associated with a message in order to determine that the message should be delivered to a local endpoint agent.

17. The computer-readable medium of claim 13, wherein the disposition of messages further comprises:
discarding a message if the message has passed through a maximum allowable number of delivery agents.

18. The computer-readable medium of claim 13, wherein the choosing of messages further comprises:
choosing a message based on a message type value assigned to the message.

19. The computer-readable medium of claim 13, wherein the choosing of messages further comprises:
choosing a message based on a message delay value assigned to the message.

20. The computer-readable medium of claim 13, wherein the disposition of messages further comprises:
determining whether the chosen message has a messages delivery value of broadcast, multicast, or point-to-point.

21. The computer-readable medium of claim 13, wherein the module creating and placing messages in a message box, generates messages with varied bursts of intensity.

22. The computer-readable medium of claim 13, wherein the module creating messages assigns a message property indicating a message delivery reliability.

23. The computer-readable medium of claim 13, further comprising:
a module for generating a graphical representation of state changes for plural endpoint agents and delivery agents.

* * * * *